United States Patent [19]

Rousseau

[11] 4,047,599
[45] Sept. 13, 1977

[54] ELECTRICALLY POWERED VEHICLE AND FEED CART

[76] Inventor: Victor Rousseau, 700 R.R. No. 1, St. Monique Parish, Nicolet County, Canada, J0G 1N0

[21] Appl. No.: 685,352

[22] Filed: May 11, 1976

[51] Int. Cl.² .............................................. H02G 11/02
[52] U.S. Cl. .......................... 191/12.2 A; 191/12.2 R; 242/86.5 R
[58] Field of Search ........... 191/12 R, 12.2 R, 12.2 A, 191/12.4; 180/65 B; 242/86.5 R, 86.51

[56] References Cited

U.S. PATENT DOCUMENTS

| 1,838,002 | 12/1931 | Sacerdoti | 191/12.2 R |
| 3,412,819 | 11/1968 | Kruckman | 191/12 R |
| 3,760,770 | 9/1973 | Weaver | 119/52 B |

FOREIGN PATENT DOCUMENTS

| 445,715 | 10/1922 | Germany | 191/12.2 R |

*Primary Examiner*—Trygve M. Blix
*Assistant Examiner*—Reinhard J. Eisenzopf

[57] ABSTRACT

A vehicle and, in particular, a feed cart as used in a barn to feed the livestock, which vehicle or feed cart is distinctively provided with an electric motor, an electric plug in cord supplying electric power to the motor from an electric outlet of the barn, a reel for the cord, and a reel drive assembly rotatively biasing the reel toward winding of the cord thereon to thus maintain the cord taut and to prevent entanglement and soiling of the cord, independently of displacement of the latter. The reel drive assembly includes a lever, with a friction drive wheel and an idler pulley rotatively mounted on the lever, and a spring biasing the lever, whereby the cord in operative engagement with the idler pulley, upon reaching a predetermined tension, causes pivoting of the lever and disengagement of the friction drive wheel from the reel and when the tautness of the cord is released, the spring acts on the lever to drivingly engage the friction drive wheel with the reel to windingly bias the cord to restore tautness thereof.

6 Claims, 4 Drawing Figures

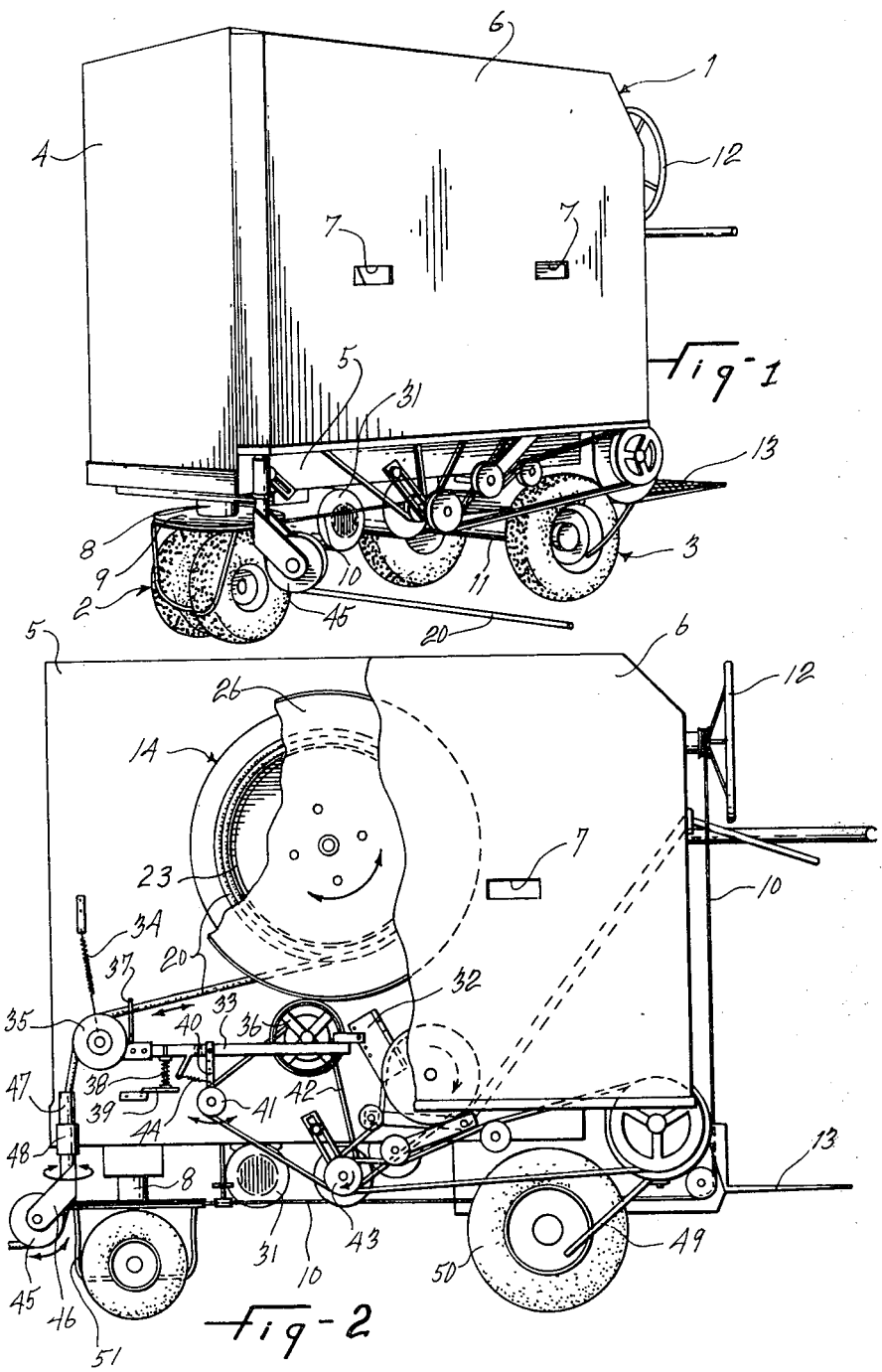

ELECTRICALLY POWERED VEHICLE AND FEED CART

This invention relates to an electrically powered vehicle and, more particularly, to an electrically powered feed cart of the type used to feed livestock inside a barn.

There has so far been proposed to feed the livestock inside barns by means of battery powered carts, as indicated, for example, by U.S. Pat. No. 3,760,770. Such battery powered vehicles have disadvantages essentially due to the use of batteries such as undue weight of the batteries, lack of space to conveniently install the batteries, and frequent recharging of the batteries.

It is a general object of the present invention to provide an electrically powered vehicle and, in particular, a feed cart, which is electrically powered by an electric plug in cord with the inherent advantages and still the mobility of which is little impaired by the presence of the electric cord.

It is a more specific object of the present invention to provide an electrically powered vehicle, and, in particular, a feed cart of the above type, wherein the electric power is fed in through an electric plug in cord which is kept taut at all times irrespective of the displacement of the vehicle to prevent entanglement and soiling of the cord.

The above and other objects and advantages of the present invention will be better understood with the following detailed description of a preferred embodiment thereof which is illustrated, by way of example, in the accompanying drawings, in which:

FIG. 1 is a perspective view of an electrically powered feed cart according to the present invention;

FIG. 2 is a side elevation view of the cart of FIG. 1 with a near side panel partly broken away;

Figures 3, 4:
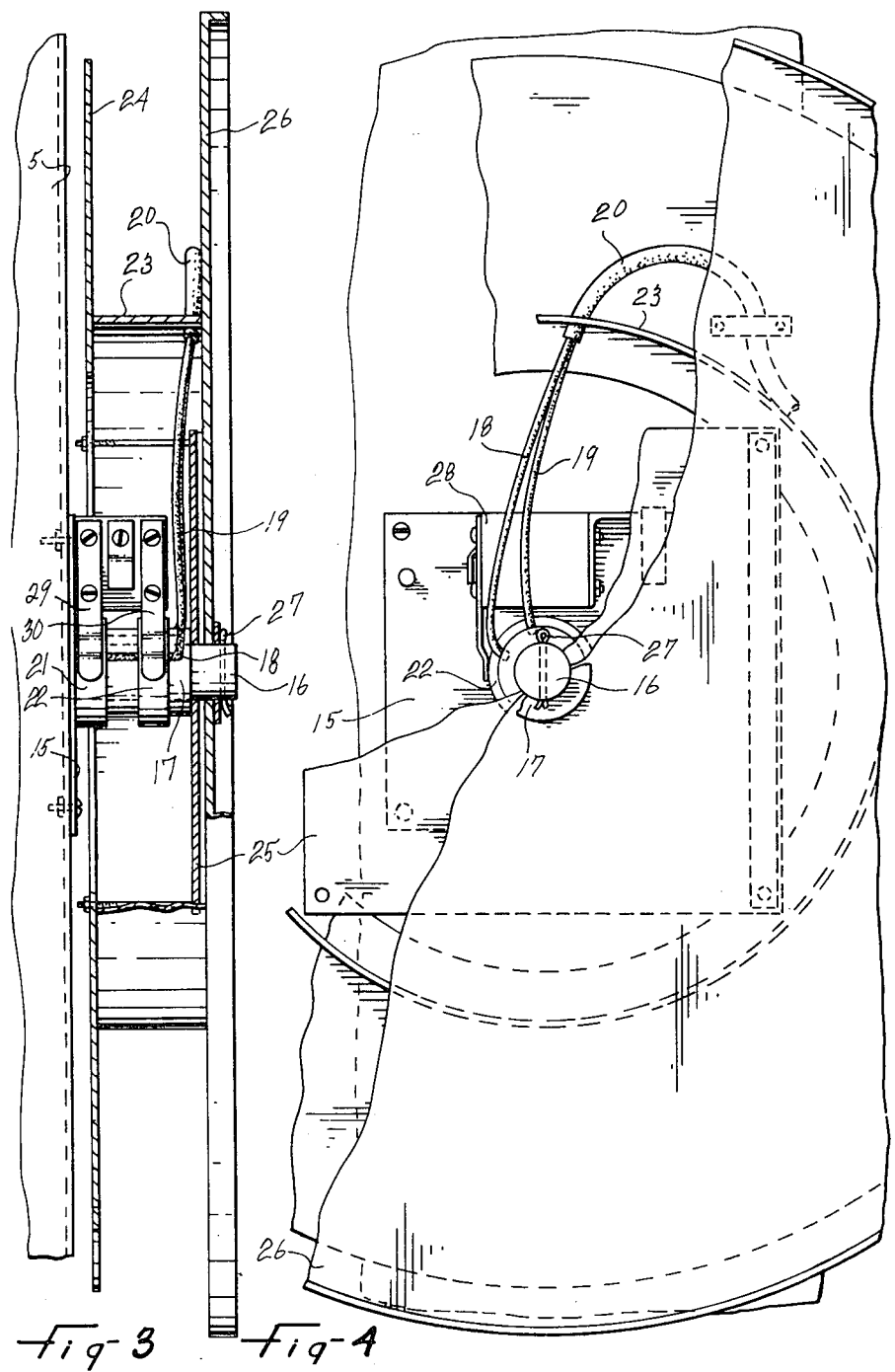
FIG. 3 is a radial with parts broken away of a reel forming part of the cart of FIGS. 1 and 2.
FIG. 4 is an axial view of the reel still with parts broken away.

The illustrated electrically powered feed cart 1 comprises a chassis, a box for the livestock feed and supporting front wheel assembly 2 and rear wheel assembly 3. The box for the livestock feed includes a front end wall 4, a side wall 5 and a covering panel 6 secured to the box to form a laterally confined space outwardly of the side wall 5. The covering panel 6 is provided with handgrip apertures 7 therein for easier removal thereof and to thus gain access to a plurality of movable parts in the above-mentioned confined space.

As is already known in the art, the front axle assembly 2 is swivelly secured to the chassis of the cart through a cylindrical axle 8 to which is secured a steerable turntable 9 having a peripheral groove in which the steering cable 10 is engaged. The rear wheel assembly 3 includes a solid axle 11. The steering cable 10 is wound on the hub portion of a steering wheel 12 rotatably mounted at the rear of the feed cart, to be conveniently accessible to an operator standing up on the platform 13 horizontally projecting at the rear of the cart.

A reel, or drum 14, is rotatably mounted outwardly of the side wall 5 about an axis extending transversely of the feed cart. A plate 15 is bolted against the external face of the side wall 5. A stub axle 16 is rigidly secured to the plate 15 and projects orthogonally thereto. A sleeve 17, of insulating material, is rotatably mounted on the stub axle 16 and has the two wires 18 and 19 of an electric plug in cord 20 fixed in longitudinal grooves at the periphery thereof. A pair of slip rings 21 and 22 are tightly engaged over the insulation sleeve 17 and in contact with the wires 18 and 19 respectively. The reel 14 includes a cylindrical center portion 23 coaxially spaced around the slip rings and the associated brushes hereinafter defined. The reel 14 also includes an annular flange 24 and a square backing plate 25 bolted together in axial clamping engagement against the opposite ends of the sleeve 17. The other flange 26 of the reel 14 is welded against the other end of the cylindrical drum or center portion 23 relative to the annular flange 24 and is provided with a cylindrical rim. A cotter pin 27 holds the reel 14 in position on the stub shaft 16.

A bracket 28 is fixed to the stationary plate 15. A pair of brushes 29 and 30 are fixed to the bracket 28 in electrical contact with the slip rings 21 and 22 respectively. The brushes 29 and 30 are connected in conventional manner to the electric motor 31 secured against the bottom of the feed cart.

A reel drive assembly according to the present invention will hereinafter be defined in details with particular reference to FIGS. 1 and 2.

This reel drive assembly includes a bracket 32 fixed against the external face of the side wall 5. A lever or bar 33 is pivotally connected at one end to the bracket 32 about a pivot axis extending parallel to the rotation axis of the reel 14. A series of apertures are provided in the bracket 32 to selectively adjust the position of the pivot axis of the lever 33. A spring 34 is connected to the lever 23 and upwardly biases the latter. An idler pulley 35 is rotatably carried at the free end of the lever 33. A friction drive wheel 36 is rotatively carried by the lever 33 adjacent the pivoted end thereof. The axes of the idler pulley 35 and of the friction drive wheel 36 extend parallel to the axis of the reel 14. A guide wire 37 is mounted on the lever 33 adjacent the idler pulley 35 and forms a guiding eye through which the electric cord is inserted. A shock absorber spring 38 is engaged around a guide pin and carried on a bracket 39 in engagement with the lever 33 to cushion the shocks tending to pivot the lever.

An arm 40 is pivotally connected to the lever 33 and rotatively carries a belt tension idler pulley 41. A belt 42 is engaged around a pulley 43 and the belt tensioning pulley 41 and is operatively connected to drive the friction drive wheel 36. A spring 44 is connected between the pivotable arm 40 and a fixed projection of the lever 33 to bias the pulley 41 toward tensioning of the belt 42.

An idler pulley 45 is rotatively carried by a fork member 46 having a hollow shaft portion 47 swivelly carried by a sleeve 48 fixedly secured upright at the corner between the front end face 4 and the side wall 5. It must be noted that the swivelling idler pulley 45 thus projects from both faces 4 and 5 and is free to swivel 270 degrees outwardly of these faces.

The electric plug in cord 20 is engaged on the idler pulley 35, inserted in the hollow shaft portion 47, looped downwardly and outwardly around the swivelling idler pulley 46, and operatively plugged in an electric outlet of the electric circuit of the barn.

The electric motor 31 is connected in any appropriate manner to rotate the pulley 43 and thus indirectly the friction drive pulley 36 which frictionally engages the cylindrical rim of the flange 26 of the reel to windingly pull on the cord 20.

If the cord 20 slackens, as when the feed cart moves closer to the electric outlet, the cord exerts less tension on the idler pulley 35 and the lever 33 is pulled upwardly, causing the friction drive wheel 36 to engage the rim of the flange 26. The reel 14 is then driven in the winding direction until the cord 20 regains a predetermined, tautness to downwardly pull the idler pully 35, the lever 33 and the friction drive wheel 36. As a result, the reel 14 stops.

If, on the contrary, the cord 20 becomes too tight, as when the feed cart moves away from the electric outlet, the lever 33 is pivoted downward until the friction drive wheel 36 frees the reel 14 and allows unwinding of cord therefrom.

The other wheels, pulleys and belts shown in FIGS. 1 and 2, and not otherwise identified, are known in the art and are provided to transmit the rotation of the motor 31 to the wheels of the rear wheel assembly, to an endless conveyor in the box of the feed cart, to a screw conveyor, and to a slasher.

The rear wheel assembly 3 is provided with a rod or finger 49 extending adjacent the wheel 50 to prevent entanglement of the cord 20 with the wheels of the cart. Similarly, the front wheel assembly 2 is provided with a tubular guard 51 for the same purpose, in relation with the front wheels.

I claim:

1. An electrically powered vehicle comprising a chassis, an electric motor secured to the chassis, an electric plug-in cord, a reel having the electric plug-in cord operatively connected thereto and wound thereon, an electrical connection electrically joining the reel to the motor, a swivelling pulley carried by the chassis, operatively engaged by the cord, and laterally guiding the latter relative to the chassis, and a reel drive assembly rotatively biasing said reel toward operative winding of the cord thereon, said reel drive assembly including a lever pivoted to the chassis about an axis parallel to the rotation axis of the reel for movement toward and away from said reel, a friction drive wheel rotatably mounted on said lever for rotation about an axis parallel to the rotation axis of the reel, said lever being spring biased to bring said friction drive wheel in driving engagement with the periphery of said reel to rotate the latter in winding direction with respect to the electric cord, and said friction drive wheel displaceable with the support away from said driving engagement with the reel, and an idler pulley rotatively carried by said lever and operatively engaged and biased by the electric cord toward displacement of the lever away from said reel and of the rotary friction wheel away from driving engagement with the reel under predetermined tension in the electric cord.

2. An electrically powered vehicle as defined in claim 1, wherein the lever is pivoted at one end about said pivot axis thereof, said friction drive wheel is rotatably carried by the lever adjacent said one end thereof, said idler pulley is rotatably carried by the other end of the lever, and a shock-absorbing spring is connected between the chassis and the lever, whereby to attenuate the transmission of shock by the electric cord to the reel.

3. An electrically powered vehicle as defined in claim 2, further including an arm pivoted to the lever, a tension adjustment idler pulley rotatively carried by said arm, a belt drivingly engaged around the tension adjustment idler pulley and the friction drive pulley, and a belt tension spring connected between the lever and the arm and operatively biasing the latter and the belt tensioning idler pulley toward tensioning of the belt.

4. An electrically powered vehicle as defined in claim 3, wherein both the lever and the arm are adjustably pivoted to the chassis and the lever respectively.

5. An electrically powered vehicle as defined in claim 4, wherein said chassis has an end face and a side face defining a mutual corner, and said swivelling pulley is pivoted at said corner and outwardly projects from both said end face and said side face, thereby allowing free 270° swivelling externally of said end and side faces.

6. An electrically powered vehicle as defined in claim 5, wherein said reel includes a cylindrical hub of insulation material and a pair of slip rings tightly and separately fitted over the cylindrical hub, said cord includes a pair of electrical wires connected to the slip rings respectively and rotatable therewith, and said electrical connection includes a pair of brushes separately fixed to the chassis and in contact with the slip rings respectively.

* * * * *